(12) United States Patent
Ether

(10) Patent No.: US 7,467,692 B2
(45) Date of Patent: Dec. 23, 2008

(54) METHOD OF AND SYSTEM FOR REDUCING POWER REQUIRED FOR AN ELECTRIC BRAKE TO MAINTAIN A STATIC FORCE

(75) Inventor: Russ Ether, Niles, MI (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 11/373,237

(22) Filed: Mar. 13, 2006

(65) Prior Publication Data

US 2006/0219491 A1 Oct. 5, 2006

Related U.S. Application Data

(60) Provisional application No. 60/662,388, filed on Mar. 17, 2005.

(51) Int. Cl.
*B60T 7/10* (2006.01)

(52) U.S. Cl. .................... 188/1.11 E; 188/156; 188/158

(58) Field of Classification Search ......... 188/156–162, 188/1.11 L, 1.11 E; 303/115.2, 3, 15, 20, 303/155
See application file for complete search history.

(56) References Cited

U.S. PATENT DOCUMENTS

| | | | |
|---|---|---|---|
| 3,711,162 A | | 1/1973 | Steinbrenner et al. |
| 3,790,225 A | * | 2/1974 | Wehde ................. 303/113.4 |
| 4,986,614 A | * | 1/1991 | Ricker et al. ............ 303/115.2 |
| 5,125,483 A | * | 6/1992 | Kitagawa et al. .......... 188/158 |
| 5,333,943 A | * | 8/1994 | Kashiwabara et al. ....... 303/112 |
| 5,468,058 A | * | 11/1995 | Linkner, Jr. .............. 303/115.2 |
| 5,496,102 A | * | 3/1996 | Dimatteo et al. ........... 303/162 |
| 6,296,325 B1 | | 10/2001 | Corio et al. |
| 6,321,884 B1 | * | 11/2001 | Balz ......................... 188/161 |
| 6,471,015 B1 | | 10/2002 | Ralea et al. |
| 6,702,069 B2 | | 3/2004 | Ralea et al. |
| 6,851,761 B2 | * | 2/2005 | Baumgartner et al. ........ 303/89 |
| 6,854,813 B2 | | 2/2005 | Yokoyama et al. |
| 6,918,470 B2 | * | 7/2005 | Guaraldo ................... 188/171 |
| 6,959,794 B2 | * | 11/2005 | Ralea et al. ................ 188/156 |
| 2003/0029680 A1 | | 2/2003 | Ralea et al. |
| 2005/0082999 A1 | | 4/2005 | Ether |
| 2005/0109565 A1 | | 5/2005 | Ralea et al. |
| 2005/0109568 A1 | | 5/2005 | Ether |
| 2005/0110339 A1 | * | 5/2005 | Kolberg ...................... 303/20 |

FOREIGN PATENT DOCUMENTS

| | | |
|---|---|---|
| DE | 3614770 | 11/1987 |
| GB | 1344358 | 1/1974 |
| WO | WO-2005/054029 A1 | 6/2005 |

* cited by examiner

*Primary Examiner*—Christopher P Schwartz
(74) *Attorney, Agent, or Firm*—Birch, Stewart, Kolasch & Birch, LLP

(57) ABSTRACT

A brake system includes a piston for applying an output force to a brake, a motor operatively connected to the piston and a controller receiving a braking request and sending a brake force signal commanding a level of brake force to the motor to cause the motor to move the piston and apply an output force to the brake. When the brake force signal remains at a first level for a given period of time, the controller automatically decreases, or increases and then decreases, the level of the brake force signal from a first value. Also a method of controlling such a brake system.

12 Claims, 2 Drawing Sheets

METHOD OF AND SYSTEM FOR REDUCING POWER REQUIRED FOR AN ELECTRIC BRAKE TO MAINTAIN A STATIC FORCE

CROSS-REFERENCE TO RELATED APPLICATIONS

The present application claims the benefit of U.S. Provisional Application No. 60/662,388, filed Mar. 17, 2005, the entire contents of which are hereby incorporated by reference.

FIELD OF THE INVENTION

The present invention is directed toward a method of reducing the power required by an electric brake for maintaining a static force, and to a system for performing this method, and, more specifically, toward a method using the internal friction of an electric brake to assist, rather than resist, the application of a static force, and a system for performing this method.

BACKGROUND OF THE INVENTION

Electric brakes include one or more electromagnetic actuators (EMA's) for producing a braking force. EMA's may include a motor that turns a ballnut/ballscrew assembly to change the position of a piston and develop an output force at the outward end of the piston that presses against a brake. Such electric brakes may be used, for example, on aircraft wheels, and will be described herein in terms of use on an aircraft. The invention discussed herein, is not, however, limited to use on aircraft and may be used in connection with other electric braking systems as well.

Internal friction in an electric brake, in the ballnut/ballscrew assembly, for example, must be overcome to move the EMA piston. Therefore the output force exerted by a piston against a brake is generally less than the force developed by the motor. Up to 30% of the motor force output may be required to overcome internal friction. Even when applying a static force, the internal friction in the EMA resists the EMA in maintaining the desired force against the brake. Therefore, the level of power delivered to the EMA must be adequate to overcome the internal friction of the EMA and produce the desired output force at the piston.

Aircraft brakes are often required to apply and hold a large static force, for example, when testing the engines prior to takeoff. Electromechanically actuated brakes require power to hold a static force. The power required increases (or decreases) as the square of the desired force. Moreover, the higher the power level applied, the more heating will be experienced by the EMA. It would therefore be desirable to reduce EMA power requirements when maintaining a desired force output.

SUMMARY OF THE INVENTION

These problems and others are addressed by the present invention, a first aspect of which is a method practiced in a brake system with a piston that applies an output force to a brake based on a brake force command. The method includes monitoring the brake force command and, after the command has remained at a substantially constant level for a given period of time, automatically decreasing the brake force command.

Another aspect of the invention is a method for use in a brake system that includes a piston for applying an output force to a brake, a motor operatively connected to the piston, and a controller receiving a braking request and sending a brake force signal commanding a level of brake force to the motor to cause the motor to move the piston and apply an output force to the brake. With this method, when the brake force signal remains at a first level for a given period of time, the level of the brake force signal is automatically increased from a first value and thereafter automatically decreased.

An additional aspect of the invention is a brake system that includes a piston for applying an output force to a brake, a motor operatively connected to the piston, and a controller sending a brake force signal the motor to produce a force with the piston. When the brake force signal remains at a first level for a given period of time, the controller automatically increases the brake force signal, and thereafter automatically decreases the brake force signal.

BRIEF DESCRIPTION OF THE DRAWINGS

These features and aspects of the invention and others will be better understood after a reading of the detailed description provided below together with the following drawings, wherein.

DETAILED DESCRIPTION

Figure 1:
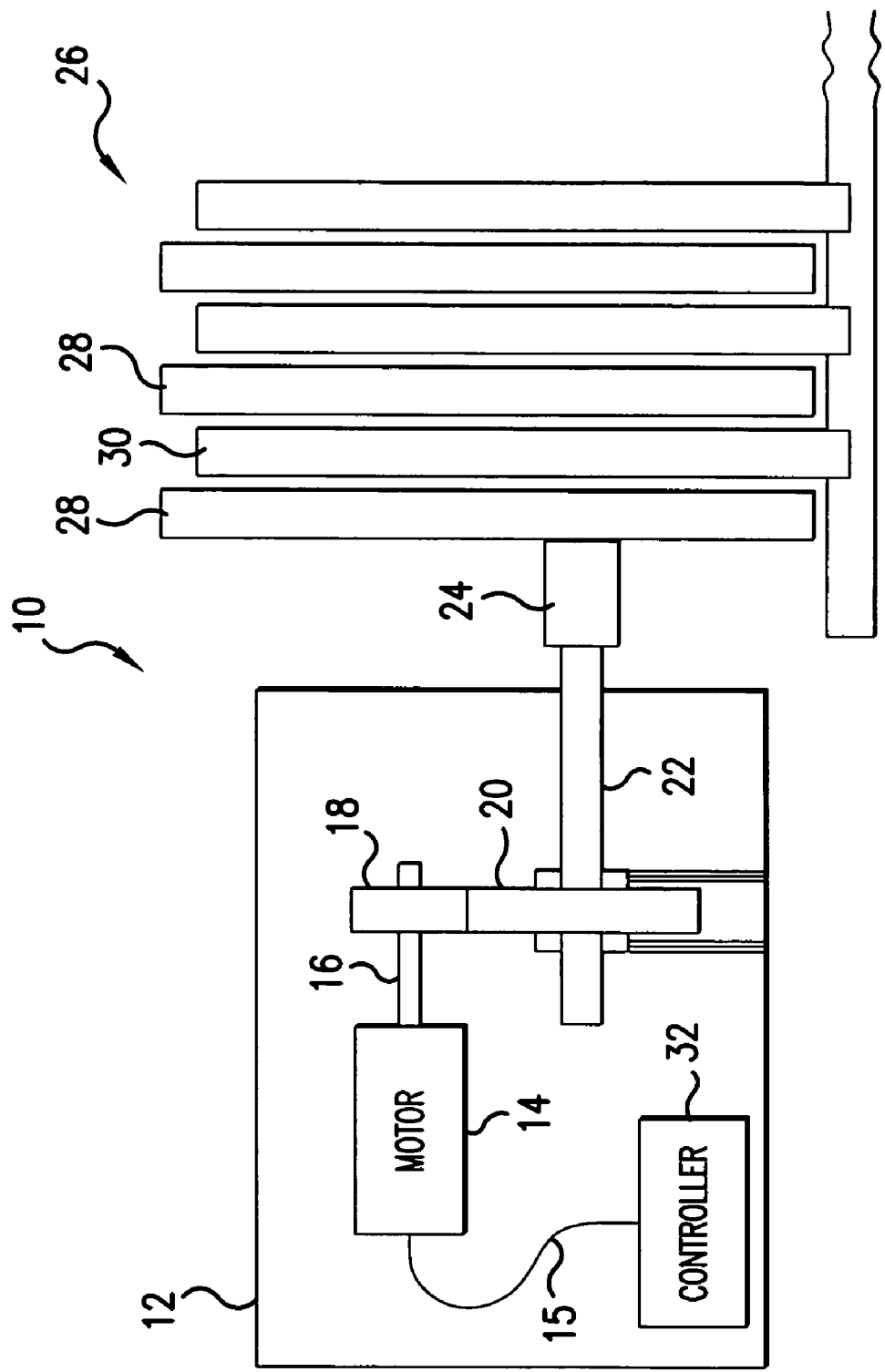
FIG. 1 schematically shows an electric brake applying force against a brake disk stack.

Referring now to the drawings, wherein the showings are for purposes of illustrating an embodiment of the invention only and not for the purpose of limiting same, FIG. 1 illustrates an electric brake 10 that includes an electromagnetic actuator 12 comprising a motor 14, a motor output shaft 16 driving gears represented by gear 18, a ballnut/ballscrew assembly comprising a ballnut 20 engaging gear 18 and a ballscrew 22 that moves in a first axial direction when ballnut 20 turns in a first direction and in a second axial direction when ballnut 20 turns in a second direction. Piston or actuator 24 moves with ballscrew 22 to selectively apply pressure against a brake disk stack 26 comprising a plurality of rotors 28 connected to a wheel and a plurality of stators 30 fixed to a stationary support structure.

Figure 2:
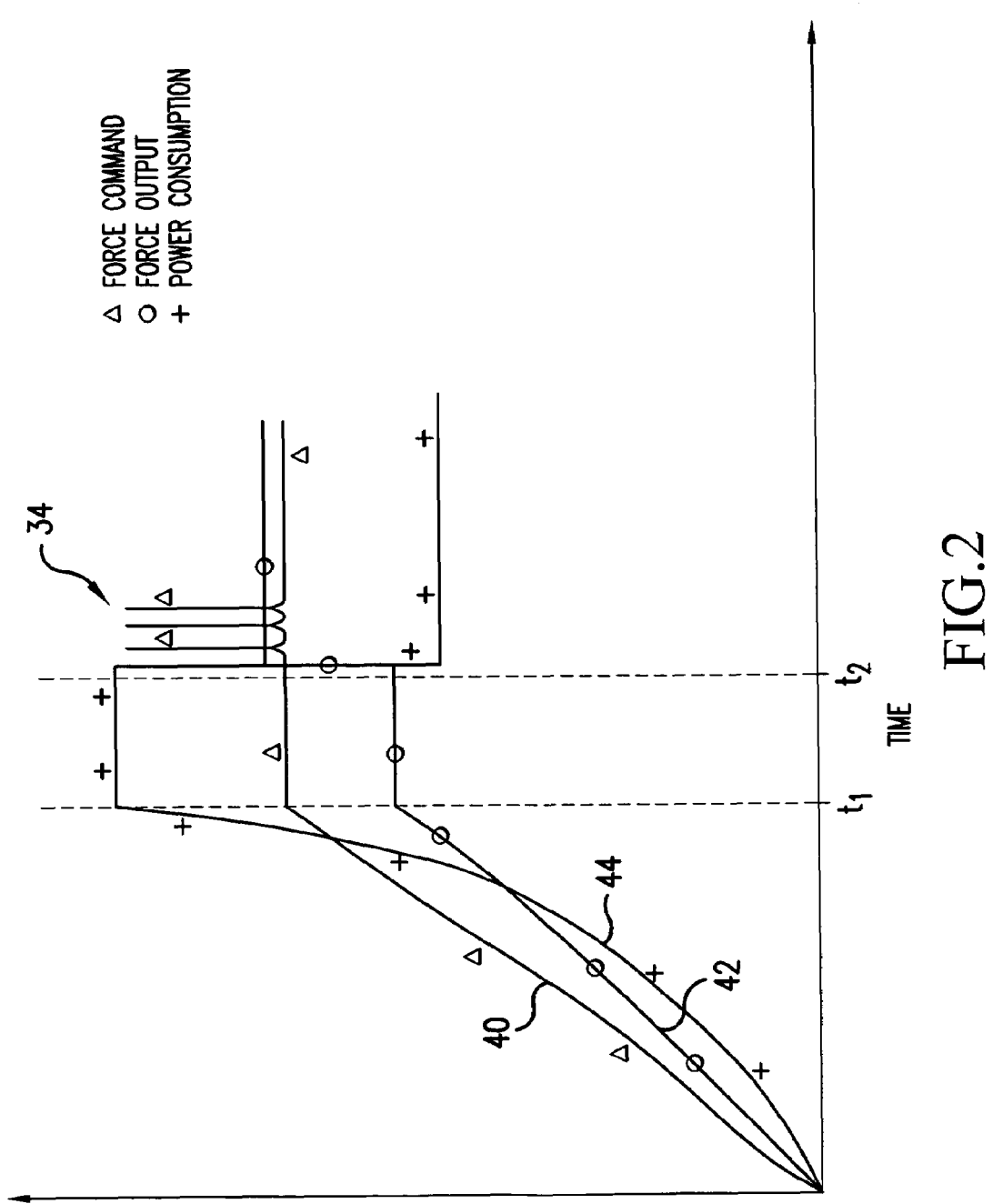
FIG. 2 is a graph illustrating the relationship between commanded brake force, output brake force and power consumption in the electric brake of FIG. 1.

In operation, controller 32 sends a brake force command to motor 14 on line 15 which causes output shaft 16 and gear 18 to rotate and apply an output force against brake disk stack 26 via the ballscrew/ballnut assembly 20, 22. This command may be generated in response to a pilot action, such as depressing a brake pedal, or automatically by the controller itself or another aircraft computer. The internal friction of the ballnut/ballscrew assembly 20, 22 prevents the force applied by piston 24 against brake disk stack 26 from equaling the commanded brake force. As illustrated in FIG. 2, at time t1, when the commanded brake force 40 has been achieved by motor 12, the output force, 42 applied by piston 24 to brake disk stack 26 is less than the commanded force. Power consumption 44 is also relatively high at time t1.

When the force command has been unchanging for some period of time t2-t1, a few seconds or less, for example, controller 32 increases the brake force command, such as by applying one or a series of command impulses 34, illustrated in FIG. 2, to motor 14 on line 15. These impulses break through the internal friction of the EMA and increase the output force to a level greater than or equal to the commanded force. When the command force returns to its pre-impulse level, the output force remains at or above the command force, and power consumption drops significantly.

After the command impulses, the internal friction of the EMA is assisting the output force rather than opposing it. In other words, instead of motor 14 working against the friction of the gears 18 in order to turn the gears further in a "forward" direction, the required output force has been exceeded and the brake stack, in effect, is now working against the internal friction of the gears to move the gears "backwards." A lower power level is required to resist this "backward" movement. Thus, by exceeding the commanded brake force and then dropping back to about the originally commanded brake force, the power consumption, and thus heat generation, will be less than if the command force had been held at a constant level.

In a broad sense, the present invention is directed to using the internal friction of the braking system to reduce power requirements. As discussed above, in some systems it may be desirable to ensure that a least a certain amount of braking is maintained. In those cases, the braking command is increased after it has stayed relatively constant for a certain amount of time. This may provide the added advantage of producing a higher output force than was being produced before the brake command was increased. However, the benefits of the present invention can also be obtained by monitoring a level of a braking command and reducing the braking command by a predetermined amount after the braking command has remained relatively constant for a period of time. Under these circumstances as well, power consumption can be reduced as the internal friction of the electric brake will no longer be working against the motor.

The present invention has been described in terms of various embodiments. However, obvious modifications and additions to these embodiments will become apparent to those of ordinary skill in the art upon a reading of the foregoing disclosure. It is intended that all such obvious modifications and additions form a part of the present invention to the extent that they fall within the scope of the several claims appended hereto.

I claim:

1. In a brake system comprising:
a piston for applying an output force to a brake;
a motor operatively connected to the piston via a gear assembly or other means of transmission; and
a controller receiving a brake force request and sending a brake force signal to the motor to cause the motor to move the piston and apply an output force to the brake;
a method for performing high force static braking with reduced motor power consumption and self-heating comprising the steps of:
generating a changing brake force signal during an initial period during which the brake force request is changing,
applying a substantially constant brake force signal during a period when the brake force request is substantially fixed, the output force being less than the brake force signal during this period, due to resisting friction in the gear assembly or transmission, and
following the period of applying the substantially constant brake force signal, while the brake force request is still substantially fixed, momentarily increasing the brake force signal to a value greater than the substantially constant brake force signal, sufficient to overcome internal friction of the gear assembly or transmission, and then reducing the brake force signal to a value somewhat less than the substantially constant brake force signal, to achieve and sustain an output force that is now assisted by the friction of the gear assembly or transmission, therefore resulting in an output force that equals or exceeds the substantially constant brake force signal, thereby providing the desired output force at a reduced power level to the motor, and reducing the heat generated inside the motor during the high force static braking.

2. The method of claim 1 wherein said step of automatically decreasing the level of the brake force signal comprises the step of decreasing the level of the brake force signal to substantially the substantially constant brake force signal, thereby assuring that the output force equals or exceeds the brake force signal, but without the power reduction.

3. The method of claim 2 wherein said step of automatically increasing the level of brake force signal comprises the step of applying at least one impulse to the brake force signal.

4. The method of claim 2 wherein said step of automatically increasing the level of the brake force signal comprises the step of applying a series of impulses to the brake force signal.

5. The method of claim 1 wherein said step of automatically increasing the level of the brake force signal comprises the step of applying at least one impulse to the brake force signal.

6. The method of claim 1 wherein said step of automatically increasing the level of the brake force signal comprises the step of applying a series of impulses to the brake force signal.

7. A brake control system comprising:
a piston for applying an output force to a brake;
a motor operatively connected to the piston via a gear assembly or other means of transmission; and
a controller receiving a brake force request and sending a brake force signal to the motor to cause the motor to move the piston and apply an output force to the brake, said brake control system performing high force static braking with reduced motor power consumption and self-heating by:
generating a changing brake force signal during an initial period during which the brake force request is changing,
applying a substantially constant brake force signal during a period when the brake force request is substantially fixed, the output force being less than the brake force signal during this period, due to resisting friction in the gear assembly or transmission, and
following the period of applying the substantially constant brake force signal, while the brake force request is still substantially fixed, momentarily increasing the brake force signal to a value greater than the substantially constant brake force signal, sufficient to overcome internal friction of the gear assembly or transmission, and then reducing the brake force signal to a value somewhat less than the substantially constant brake force signal, to achieve and sustain an output force that is now assisted by the friction of the gear assembly or transmission, therefore resulting in an output force that equals or exceeds the substantially constant brake force signal, thereby providing the desired output force at a reduced power level to the motor, and reducing the heat generated inside the motor during the high force static braking.

8. The system of claim 7, wherein said controller automatically decreases the level of the brake force signal by decreasing the level of the brake force signal to substantially the substantially constant brake force signal, thereby assuring that the output force equals or exceeds the brake force signal, but without the power reduction.

9. The system method of claim 8 wherein said controller automatically increases the level of brake force signal by applying at least one impulse to the brake force signal.

10. The system of claim 8 wherein said controller automatically increases the level of the brake force signal by applying a series of impulses to the brake force signal.

11. The system of claim 7 wherein said controller automatically increases the level of the brake force signal by applying at least one impulse to the brake force signal.

12. The system of claim 7 wherein said controller automatically increases the level of the brake force signal by applying a series of impulses to the brake force signal.

* * * * *